Sept. 25, 1945.  E. W. EKSTRAND  2,385,618
SORTING DEVICE
Filed Nov. 19, 1943  7 Sheets-Sheet 2

Fig. 2.

INVENTOR
Ernest W. Ekstrand.
BY
James D. Bock
ATTORNEY

Sept. 25, 1945.  E. W. EKSTRAND  2,385,618
SORTING DEVICE
Filed Nov. 19, 1943   7 Sheets-Sheet 3

Fig. 3.

INVENTOR
Ernest W. Ekstrand
BY
James D. Bock
ATTORNEY

Sept. 25, 1945.  E. W. EKSTRAND  2,385,618
SORTING DEVICE
Filed Nov. 19, 1943  7 Sheets-Sheet 5

INVENTOR
Ernest W. Ekstrand
BY
James D. Boch
ATTORNEY

Sept. 25, 1945. E. W. EKSTRAND 2,385,618
SORTING DEVICE
Filed Nov. 19, 1943 7 Sheets-Sheet 7

INVENTOR
Ernest W. Ekstrand
BY
James D. Bock
ATTORNEY

Patented Sept. 25, 1945

2,385,618

UNITED STATES PATENT OFFICE 2,385,618

SORTING DEVICE

Ernest W. Ekstrand, Orange, N. J., assignor to Consolidated Packaging Machinery Corporation, a corporation of New York Application November 19, 1943, Serial No. 510,865

14 Claims. (Cl. 209—72)

It is an object of this invention to provide a machine which will rapidly remove objects from an indiscriminate mass and arrange them in a particular order.

It is a further object of this invention to provide a machine as aforesaid particularly adapted to handle elongated objects having differentiated ends in which each end is smaller in cross section than the body of the object.

It is a further object of this invention to provide a machine as aforesaid, particularly adapted to orienting bullet cores.

These and other objects will be made clear from the following description taken in connection with the annexed drawings in which.

This invention is described and illustrated with reference to the handling of bullet cores because it was in that connection that the machine was developed. It is, however, entirely applicable to other uses and it is not intended to restrict this disclosure to bullet cores specifically.

Bullet cores due to their particular configuration present a highly specialized problem of orienting. The prior art affords a multitude of examples of machines for orienting cup-shaped objects or for orienting objects having one end considerably enlarged as against the remainder of the object. In a bullet core, however, there is an elongated, substantially cylindrical body with a substantially conical point at one end and substantially the frustum of a cone at the opposite end. In addition the bullet core is a solid without such a re-entrant pocket as is found in cup- shaped bottle caps and is also without any substantial displacement of its center of gravity away from its median point. The ordinary principles of orientation are not therefore applicable to this problem.

The machine disclosed herein has all of its actually operative elements contained in the drum. This must be provided with a mounting and a drive, and the mounting preferably should be arranged so that the axis of the drum can be adjustably tilted relative to the horizontal. The construction of the supporting frame is, therefore, of no real importance and the same may be said of the details of the various drives.

Figure 1:
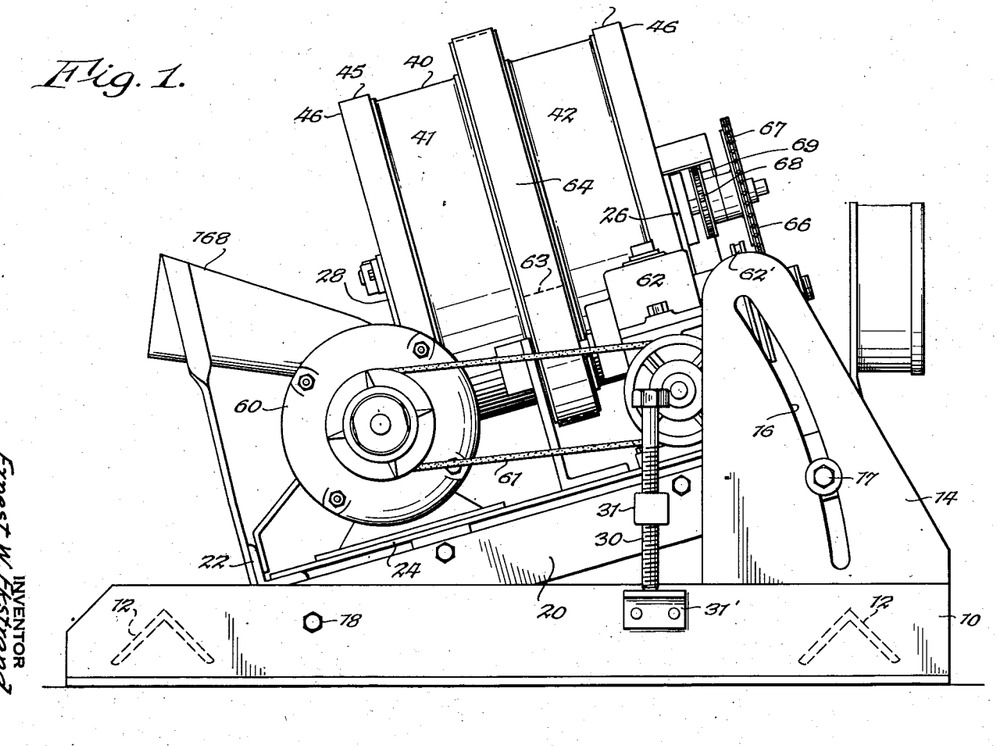
Fig. 1 is a side elevation of the machine.
Figure 2:
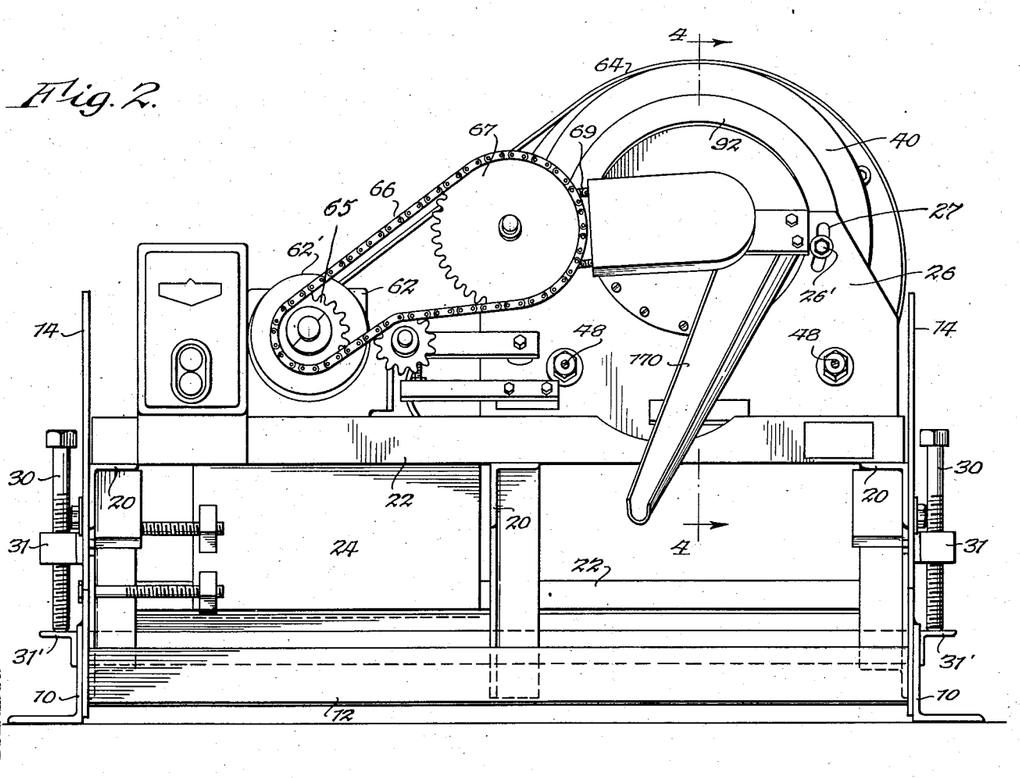
Fig. 2 is a front elevation.
Figure 3:
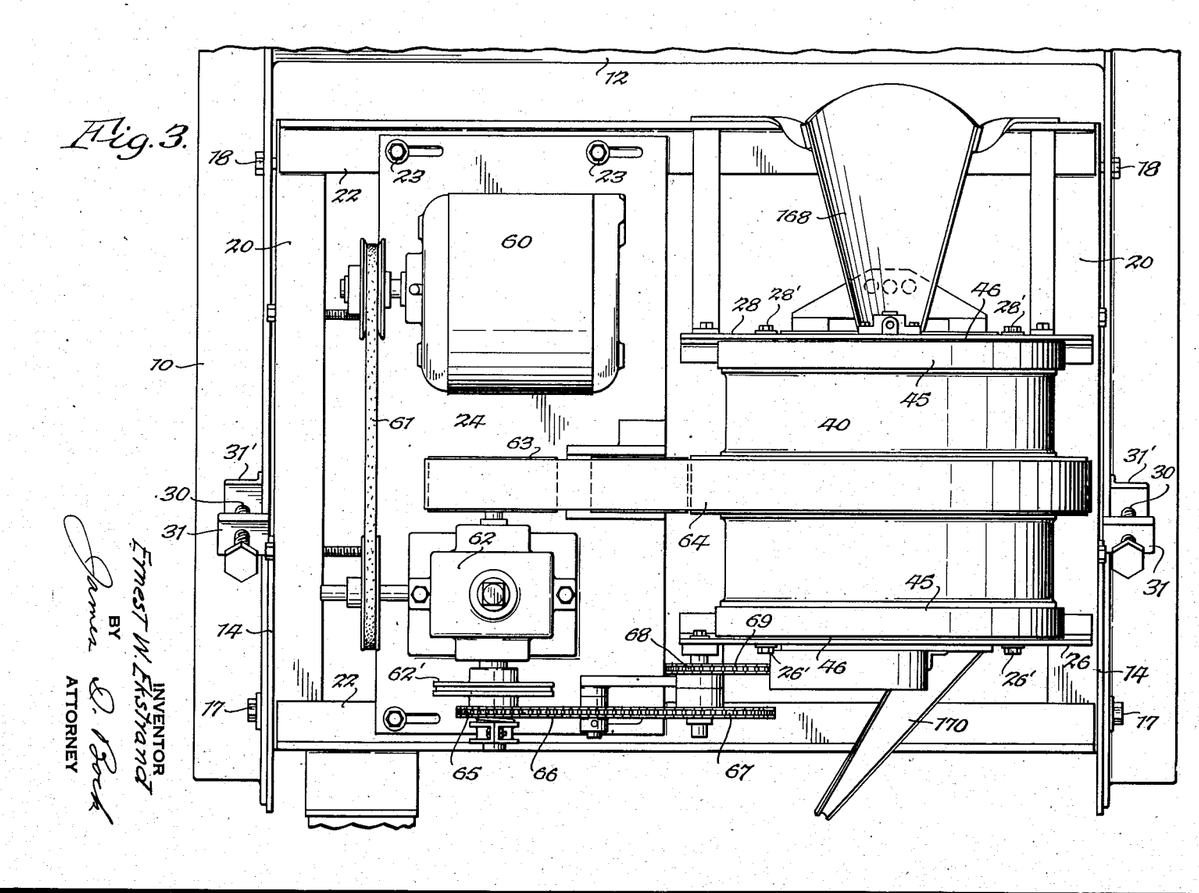
Fig. 3 is a plan view.

As best shown in Figs. 1, 2 and 3, there is a main base formed of side angles 10 and cross angles 12 welded thereto. At one end of the side angles 10 are welded vertical plates 14 having therein arcuate grooves 16. At the opposite end, studs 18 pierce the side angles 10 to afford pivotal support for a tilting, drum-supporting frame which will now be described.

The tilting frame carries the active parts of the machine and comprises side and central angles 20 connected by cross angles 22. A plate 24 (Fig. 3) connects the cross angles 22 and is adjustably connected therewith at 23. The plate 24 supports the motor and driving gear hereinafter described. Welded to the side angles 22 and at one side of the plate 24 are two plates extending upwardly from the side and central angles 20. One of these, 26, is at the tilting end of the frame and the other, 28, is at the pivot end. As above noted, the pivot end of the tilting frame centers on the studs 18. The free end of the tilting frame is supported by studs 17 which pass through the arcuate slots 16 in the plates 14 welded to side angles 10 of the main supporting base.

The adjustment of the tilting frame relative to the horizontal is accomplished by means of bolts 30 which pass through lugs 31 pivotally mounted on the tilting frame (see Fig. 2) and bear on lugs 31' welded to the main supporting frame. Upward adjustment is accomplished by loosening the studs 17 in the slots 16 of the plates 14 and advancing the bolts 30 through the lugs 31 and against the lugs 31'. In lowering the tilting frame the weight of the frame and its assembled parts carries the frame downward as the bolts 30 are withdrawn through the lugs 31.

The general structure and mounting of the drum, which forms the basic element of the machine, will best be understood by reference to Figs. 1, 2, 3 and 4. The drum is indicated generally by the reference numeral 40. Purely for convenience of manufacture the drum 40 is shown as composed of two cylindrical castings 41 and 42, joined together by bolts 43 (Fig. 4) passing through central flanges 44. These central flanges 44 after being drawn together are turned to a suitable diameter and profiled to form a crowned pulley face.

At each end of the drum 40 is a finished surface 45 concentric with the axis of the drum and a finished surface 46 normal to the axis of the drum. The concentric surface 45 at the end of the drum nearest the pivot of the tilting frame is supported on rollers 47 (Fig. 6) which rollers are supported by studs passing through the plate 28. Similar rollers support the opposite concentric surface 45 and are in turn supported by studs 48 (Fig. 2) passing through plate 26.

The drum 40 is supported against axial shifting by a roller 50 bearing against the finished surface 46 of the drum 40 nearest the pivoted end of the tilting frame, and by a similar roller 51 bearing against the opposite surface 46. The roller 50 is supported on a shoulder stud 50' mounted in a boss 52 bolted to the plate 28 while the roller 51 is supported on a shoulder stud 51' mounted in a boss 53 bolted to the plate 26.

On the plate 24 is mounted a motor 60 which through a belt 61 drives a speed reducer 62. The speed reducer 62 has two output shafts, on one of which is mounted a pulley 63 driving a belt 64 which engages the pulley face formed by finishing the central flanges 44 of the drum 40, and on the other of which is mounted a sprocket 65 driving a chain 66 which in turn drives an idler sprocket 67 (Figs. 2 and 3). Mounted on the same shaft with the idler sprocket 67 is a sprocket 68 which through a chain 69 drives another sprocket 70 (Fig. 4) for a purpose hereinafter to be described.

A slip clutch 62' is inserted between the speed reducer 62 and the sprocket 65 in order to prevent damage incident to jamming of the parts driven by the sprocket 70.

Figures 4, 5:
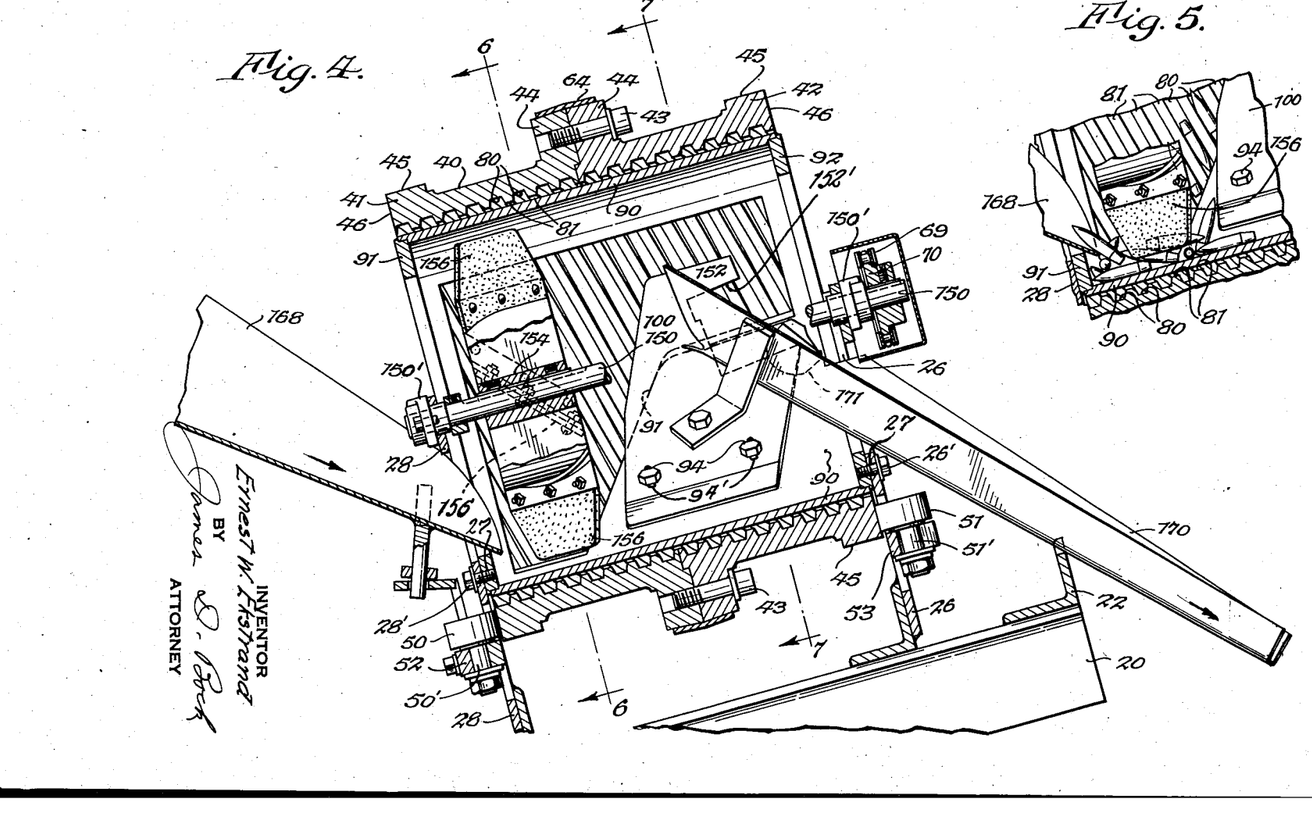
Fig. 4 is a section on the line 4—4 of Fig. 2.
Fig. 5 is a fragmentary section similar to Fig. 4 showing the bullet cores in the bottom of the drum.
Figure 6:
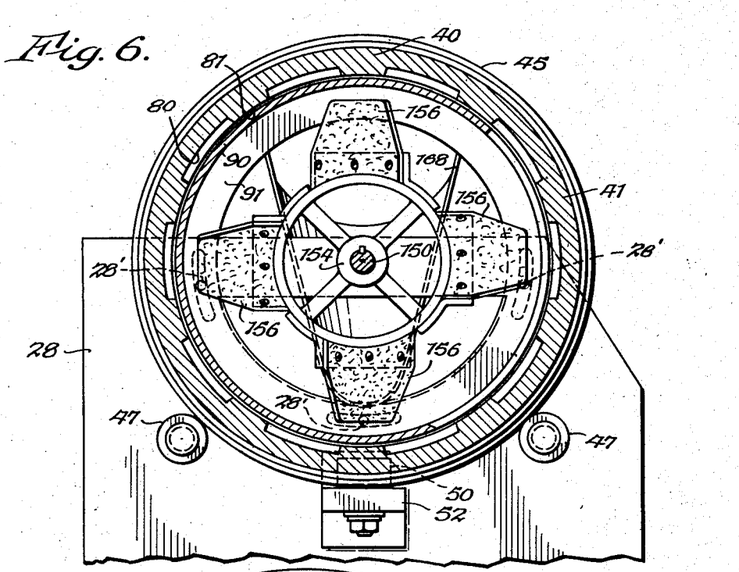
Fig. 6 is a sectional view taken on the line 6—6 of Fig. 4.
Figure 7:
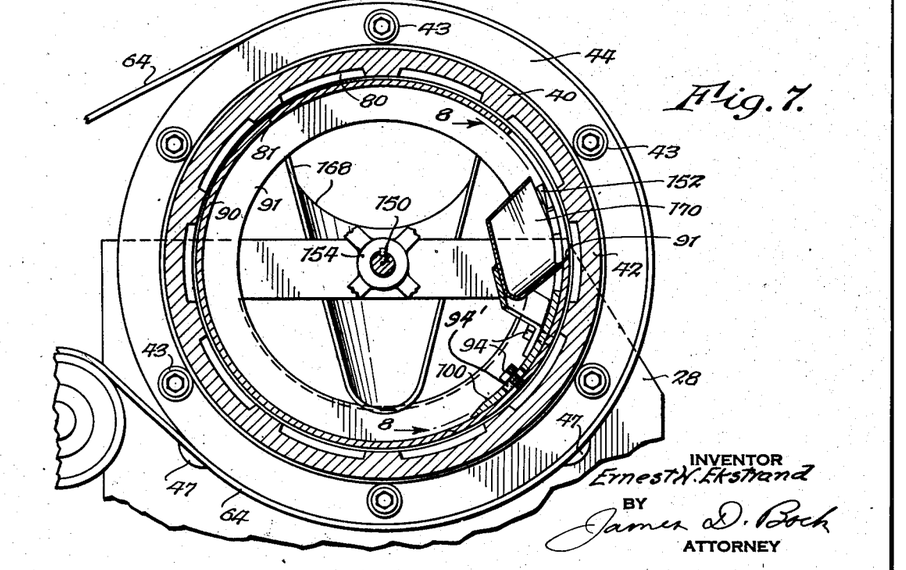
Fig. 7 is a similar view taken on the line 7—7 of Fig. 4, in which the paddle wheel has been partially removed.

Referring now to Figs. 4, 6 and 7, the inner surface of the drum 40 is finished in the form of a multi-thread helix providing a plurality of grooves 80. The groves 80 with their complementary ridges 81 define a plurality of parallel helical passageways each having a depth from the crest of a ridge 81 to the bottom of a groove 80 which is less than the diameter of the bullet core to be oriented. While the grooves and ridges are shown as being formed by machining or cutting into the inner surface of the drum 40, it is clear that a similar structure could be provided by means of an inserted sleeve or by welding or otherwise securing helical ribs to a cylindrical surface or by any other means considered appropriate by a skilled designer.

The lead of the helices taken in conjunction with the angle of tilt of the drum relative to the horizontal should be such that, taking into account the coefficient of friction between the bullet core and the walls of the groove, no substantial resistance to the advance of a bullet core along any helix will be encountered.

A sleeve 90 (Figs. 4, 6 and 7) is provided which is stationary relative to the drum 40. The end of the sleeve 90 nearest the pivot of the tilting frame is supported on a ring 91 which in turn is secured to the plate 28 by means of cap screws 28' which pass through slots 27 in plate 28 and which are concentric to the axis of drum 40 and sleeve 90. The opposite end of the sleeve 90 is secured to a ring 92 which in turn is fastened to the plate 26 by means of cap screws 26' which pass through similar slots 27 in the plate 26 (see Figs. 2 and 4). As shown particularly in Figs. 6 and 7, the sleeve 90 is cut away at one side of the drum 40 between the arrows 8—8 (Fig. 7) to leave an opening extending from slightly above the bottom of the drum 40 to slightly below the top on one side of the vertical center line. In effect the sleeve 90 constitutes a stationary hopper receiving indiscriminate masses of bullet cores and from which relatively measured portions of such masses are delivered to the grooves 80 of the drum 40 by means to be described hereinafter.

Attached to the sleeve 90 by means of cap screws 94 is an arcuate plate 100 (Fig. 7) which projects across a part of the space formed by the cut away portion in the sleeve 90 to form, with the grooves 80 and the ridges 81, a series of enclosed passageways. The surface of the plate 100 is spaced from the bottoms of the grooves 80 by a distance slightly greater than the diameter of the bullet cores. At the same time the cut away edge 91 (Fig. 4) of the sleeve 90 forms a steep helix from the lowermost toward the uppermost end of the drum 40 and a less steep helix at its upper portion. The surface of the sleeve 90 adjacent the ridges 81 of the drum 40 is spaced from the bottom of the grooves 80 by a distance less than the diameter of the bullet cores. Under these conditions, when the drum 40 is rotated, bullet cores falling into the grooves 80 will be fed axially of the drum 40 by the helical advance of the grooves and circumferentially by the sloping inner edge 91 of the sleeve 90 and will be retained in such relationship by the plate 100.

Before completing a detailed description of the behavior of the bullet cores as they are advanced by the interaction of the grooves 80, the edge 91 of the sleeve 90, and the retainer plate 100, it is necessary to describe the elements which deliver fairly uniform portions of the mass of bullet cores in the bottom of the sleeve 90 to the grooves 80. These are best shown in Figs. 4 and 5. A shaft 150 is journaled in bearings 150' supported by plates 26 and 28 hereinbefore described as welded to the tilting frame. The shaft 150 is slowly rotated by the sprocket 70 which is driven from the speed reducer 62 by means heretofore described. A hub 154 is keyed to the shaft 150 and a number of paddles or blades 156 (Fig. 6) are secured to the hub. The blades 156 are formed of leather or other suitable, yieldable material.

Bullet cores are delivered to the machine through a chute 168. The precise method of delivery is not important. The cores might be delivered to the chute 168 by a machine attendant dumping them in from a shovel, or they might arrive at the chute on a belt conveyor. The chute guides them into the pocket formed by the bottom of the sleeve 90 and the ring 91.

As the cores drop into the pocket just described, many of them have a tendency to assume positions generally lengthwise with respect to the axis of the sleeve 90 and therefore extend crosswise of the grooves 80 of the drum 40. Cores thus positioned tend to merely roll over and over without entering the grooves 80, or only after some loss of time, thus slowing down the eventual delivery of the cores from the machine. The paddles 156 have been provided to overcome this difficulty. It will be seen (see Fig. 4) that the free ends or edges of the paddles or blades 156 are disposed at approximately an angle of 45° with respect to the axis of the drum 40 and sleeve 90 and in a direction to form a somewhat acute angle with the helical grooves 80.

By this arrangement the ends of the paddles 156 act to engage the cores and sweep them upwardly and towards the right in Fig. 4, so that cores that may assume positions crosswise of the grooves 80, as explained above, will be quickly urged by the angularly arranged blade ends into directions parallel with and will enter the grooves 80.

By forming the paddles or blades 156 of leather or other suitable yielding material the blades can pass over any cores which may momentarily bunch up or accumulate. Thus interruption of or damage to the machine by jamming is avoided.

The grooves 80 bring about parallelism of the axes of the cores as they drop into grooves 80 as the same are consecutively presented by the rotation of the drum 40.

The inclined edge 91 of the sleeve 90 is spaced from the bottoms of the grooves by a distance less than the diameter of the bullet cores. As the cores advance axially of the drum 40 by virtue of the helical character of the grooves, the edge 91 supports the cores and due to its inclination, feeds the cores circumferentially of the drum 40. As the axes of the cores approach the vertical there would be danger of their toppling toward the interior of the drum 40 were they not retained by the plate 100.

While the interaction of the blades 156 and the grooves 80 effects orientation of the indiscriminate mass of cores at least to the extent of bringing about parallelism of the axes, it is clear that in the mechanism so far described there is nothing to orient successive cores relative to the differential ends of each core. This final step is accomplished in the course of delivering the cores to a discharge chute 170.

Figure 8:
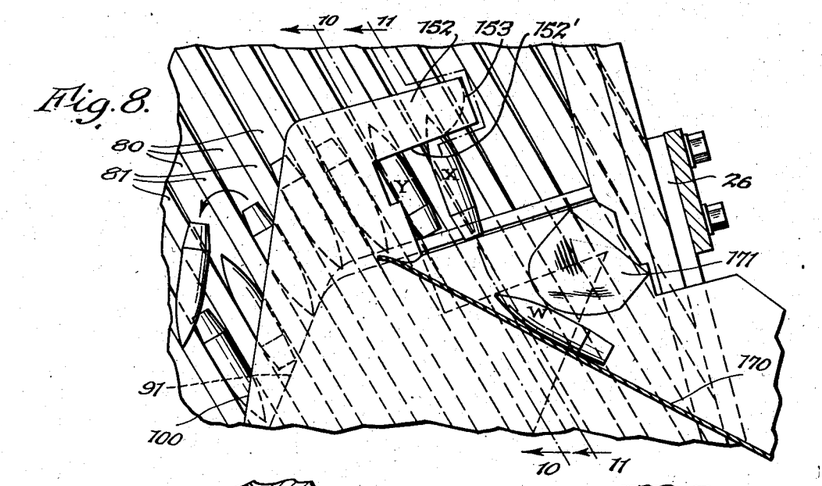
Fig. 8 is a sectional view taken along line 8—8 of Fig. 7.
Figure 9:
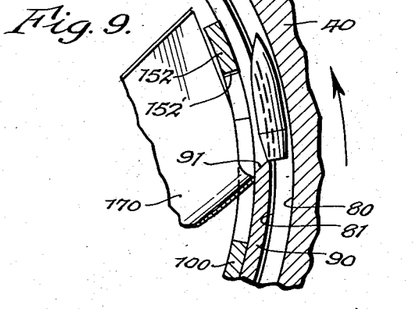
Figs. 9, 10, and 11 show the movement of the bullet core when the blunt end of the core is lowermost.
Figure 10:
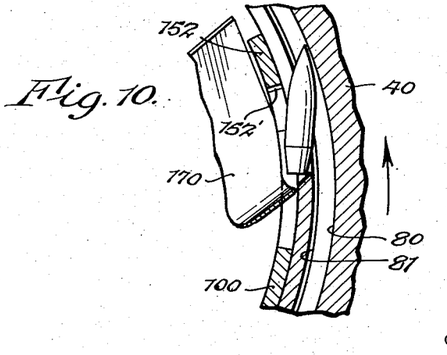
Figure 11:
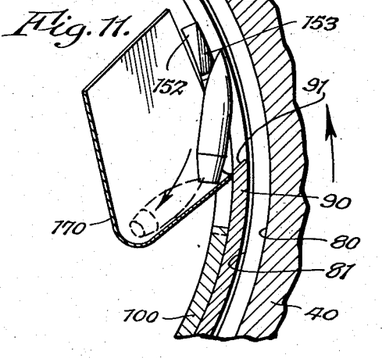

The action with respect to cores having their blunt ends riding on the edge 91 of the sleeve 90 is shown in Figs. 8 to 11, inclusive. In Fig. 8 a core W is shown sliding blunt end foremost down the chute 170, another core X as it is about to drop blunt end foremost into the chute, and another core Y is shown as it approaches the critical point. It is to be noted that the edge 91 of the sleeve 90 is beveled adjacent the discharge point. When the core has reached this point the curvature of the drum 40 has brought the axis of the core at an inclination to the vertical toward the interior of the drum. The core is, however, slightly heavier at the blunt end and it therefore slides across the beveled edge 91 and drops, butt foremost, into the trough 170. The wall of the trough 170 adjacent the beveled edge is mounted and inclined so as to form, as nearly as possible, a continuation of the bevel of the edge 91. A finger extension 152 of the retaining plate 100 is disposed with an edge 152' lying substantially parallel with the edge 91 at the discharge point and is spaced therefrom a distance somewhat less than the overall length of a bullet core. This finger extension 152 serves to prevent toppling of the cores X and Y until these cores have received a sufficient inclination to the vertical to slide across the edge 91 and to drop into the trough 170. At its free end the finger 152 has a slight bevel 153 facing the grooves 80 which affords clearance for the final tilting of the core as it drops, an action best illustrated in Fig. 11.

When the cores have their pointed ends downward it is necessary to topple them so that they will land in the chute 170 and slide down it with their blunt ends foremost. This action is illustrated in Figs. 12 through 16, inclusive. The pointed end of the core enters the space between the edge 91 of the plate 90 and the bottom of the groove 80 and its uppermost, blunt end does not, therefore, extend as far above the edge 91 as does the pointed end when the blunt end is downward in the condition illustrated in Figs. 8 through 11. As the cores ride higher on the surface of the drum 40 their axes are more and more inclined from the vertical toward the interior of the drum and the core topples from the condition shown in Fig. 13 to that shown in Fig. 14 so that the uppermost blunt end of the core rests against the finger 152. As the core continues to advance this tilting is accentuated by the bevel 153 at the free end of the finger 152. By the time the core passes beyond the free end of the finger 152 it is so far inclined to the vertical that gravity plus the restraint of the edge 91 adjacent the pointed end forces the core to topple end for end over the edge 91 to bring the core into the chute 170 with the blunt end foremost, an action illustrated in Fig. 15.

It will be understood from the foregoing that the action of the drum 40, due to its curvature, causes the objects to incline towards the interior of the drum as their trailing ends engage upon or move adjacent to the beveled edge 91 of plate 100. However, there is a critical point for the location of the beveled edge 91 in order to insure the correct action of the cores for their intended discharge movement over the edge 91, and this critical point varies upwardly or downwardly to some extent, depending on the size, weight, center of gravity, and other characteristics of different cores or other bodies.

This critical adjustment can be conveniently and quickly effected by loosening the bolts 26' and 28' which secure the sleeve 90 to the plates 26 and 28, respectively. When the bolts are loosened, the sleeve 90 may be axially rotated with respect to the drum 40 to the desired extent within the limits of the curved slots 27.

When the sleeve 90 is thus adjusted the plate 100 moves with it, so that the edge 152' of the extension 152, and therefore the space between this edge and beveled edge 91, retains the same relation to plate 100 as before.

Should it be deemed desirable to vary the distance between the beveled edge 91 and the edge 152' to accommodate cores or objects of different lengths, this can be done by providing slots 94' in the plate 100 through which the bolts 94 which secure this plate to the sleeve 90 extend. By appropriate manipulation of the bolts 94 and the plate 100 the edge 152' may be shifted towards or from the beveled edge 91, the plate 100 then being secured in the desired position.

Figure 12:
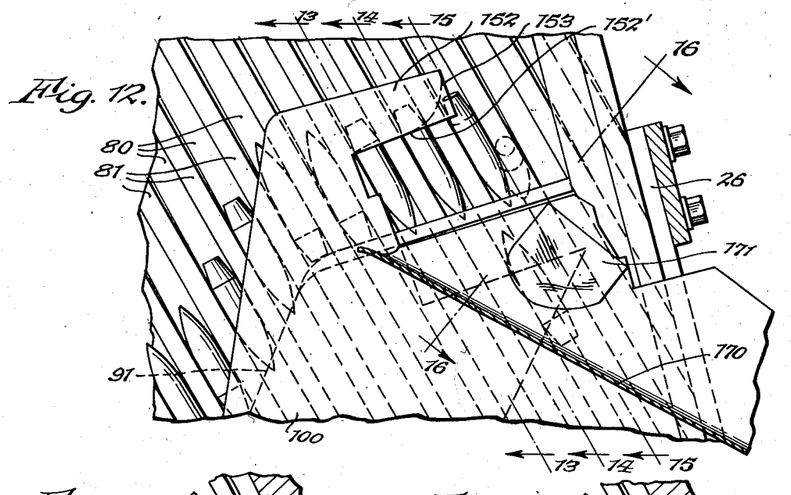
Figs. 12, 13, 14 and 15 show the movement of the bullet core when the conical end is lowermost.
Figure 13:
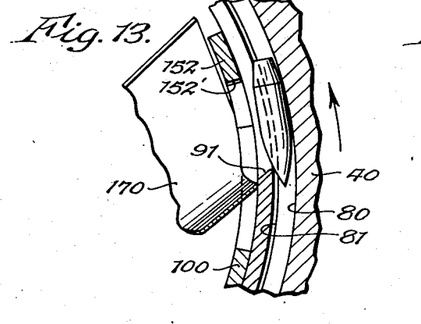
Figure 14:
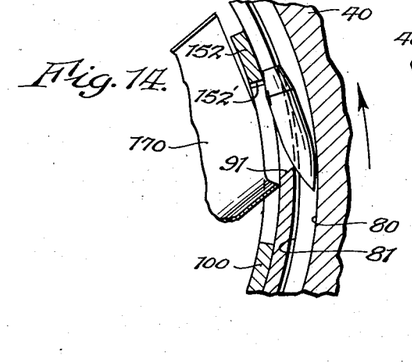
Figure 15:
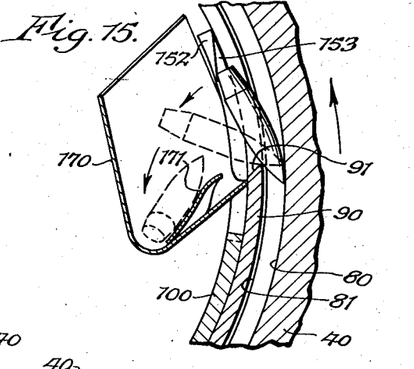
Figure 16:
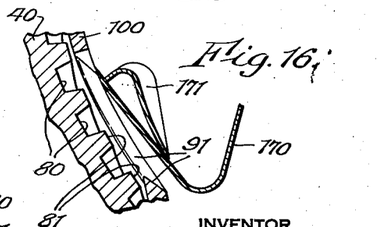
Fig. 16 is a sectional perspective view on line 16—16 of Fig. 12.

This machine is capable of orienting bullet cores at a rate in excess of 330 per minute and it will be obvious in comparing Figs. 8 and 12 that it is possible for a core with its blunt end down and a core with its pointed end down to drop almost simultaneously. If the core which topples end for end were permitted to strike, say, the pointed end of a core already in the chute, the impact might be sufficient to reverse the previously oriented core and place it backward in the alignment of cores in the chute 170. In order to eliminate this possibilty there is provided a concave baffle 171 attached to a wall of the trough 170 and positioned adjacent the point at which cores with the pointed end downward will be discharged end for end from the edge 91. The baffle 171 provides, in effect, a false bottom against which the toppling cores must strike approximately as they complete their end for end movement and before they can have an opportunity to turn over further, and also before they can strike another core already in the chute 170. The baffle thus absorbs the impact, permitting the intercepted toppling core thereafter to slide gently into the line of oriented cores which, with their axes aligned, proceed down the chute 170.

The general action of the machine may be summarized as follows: consecutive cores are removed from an indiscriminate mass and brought into a relationship in which their axes are parallel; they are then brought into a relationship in which their axes are in alignment, and during the transfer from parallelism to alignment the cores are adjusted so that all face the same way. The mechanical details of the machine are capable of great variation without effect upon the basic principles and elements. The proportions of the machine will depend on the size, weight, shape and on the nature of the material of the cores. Such variations in mechanical details and in proportions are within the skill of a designer faced with the problem of handling any particular job.

What is claimed is:

1. In an orienting device in which consecutive, elongated objects having differentiated ends are advanced to a position in which their longitudinal axes are parallel and substantially vertical, the combination comprising: a member having a beveled edge supporting the ends of said objects; means for inclining the axes of said objects progressively away from the vertical as the objects advance along said edge; a member temporarily restraining said objects from toppling off said edge; said edge and said member being so related that objects having one type of end against the edge will drop off said edge without toppling and objects having the opposite end in contact with said edge will topple therefrom; and means for receiving and discharging said objects with their axes in alignment.

2. In an orienting device in which consecutive, elongated objects having differentiated ends are advanced to a position in which their longitudinal axes are parallel and substantially vertical, the combination which comprises: a member having a beveled edge supporting the ends of said objects; means for inclining the axes of said objects progressively away from the vertical as the objects advance along said edge; a member temporarily restraining said objects from toppling off said edge; said edge being spaced from said member in a direction axial of said objects by a distance less than the length of said objects; and said member terminating in a free end short of the end of said edge which free end is so formed that objects having one type of end against the edge will drop from said edge with that end down without toppling before reaching the extremity of said free end of said member and objects having the opposite end in contact with said edge will topple end for end therefrom after passing said free end; and means for receiving and discharging said objects with their axes in alignment.

3. In a machine for longitudinally orienting a plurality of elongated objects having differtiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing a portion of said grooves; a supplementary shield conforming to said cylindrical surface and having its inner surface spaced from said groove roots by a distance slightly greater than said minor axis dimension; said supplementary shield overlying a part of the opening in said sleeve; and means to rotate said drum relative to said sleeve and shield.

4. In a machine for longitudinally orienting a plurality of elongated objects having differentiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing a portion of said grooves; means for delivering the objects within said sleeve adjacent said opening; movable means within said sleeve and including parts which extend crosswise of the grooves exposed in said opening and are engageable with said objects to turn and urge them into positions in which they may freely enter and lie along said grooves; and means cooperating with said shell and said sleeve for subsequently effecting discharge of said objects from said shell with like ends of said objects extending in the same direction.

5. In a machine for longitudinally orienting a plurality of elongated objects having differentiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing a portion of said grooves; means for delivering the objects within said sleeve adjacent said opening; a wheel within said sleeve which is mounted to rotate upon the axis of said sleeve and drum and having blades the free ends of which extend crosswise of the grooves exposed in said opening and are engageable with said objects to turn and urge them into positions in which they may freely enter and lie along said grooves; and means cooperating with said shell and said sleeve for subsequently effecting discharge of said objects from said shell with like ends of said objects extending in the same direction.

6. In a device for orienting an indiscriminate mass of elongated objects having differentiated ends, means for advancing objects from said mass to a position in which their axes are parallel and disposed substantially vertical and in which some of said objects are disposed with one type of end lowermost while others have their opposite ends lowermost, means for causing those of said objects having one type of end lowermost to drop from said position through a selected zone without toppling and for causing said other objects having their opposite ends lowermost to topple end for end from said position through another and separate zone, and means interposed in the last mentioned zone to intercept said toppling objects approximately as they complete their end for end movement, said intercepting means acting to guide said intercepted objects into a course corresponding to that of said unintercepted objects.

7. In a machine for longitudinally orienting a plurality of elongated objects having differentiated ends, a cylindrical shell having helical grooves on its interior adapted freely to receive the minor axes of said objects; a stationary sleeve conforming to said cylindrical surface and spaced from the roots of said grooves by a distance slightly less than the minor axis dimension of said objects, said sleeve having an opening exposing a portion of said grooves, a supplementary shield conforming to said cylindrical surface and spaced from said groove roots by a distance slightly greater than said minor axis dimension, said supplementary shield overlying a portion of the opening in said sleeve; means to rotate said drum relative to said sleeve and shield, said shell, said sleeve and said shield being inclined to the horizontal.

8. In a machine for longitudinally orienting a plurality of elongated objects having differentiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing a portion of said grooves; a supplementary shield conforming to said cylindrical surface, and having its inner surface spaced from said groove roots by a distance slightly greater than said minor axis dimension, said supplementary shield overlying a part of the opening in said sleeve; means to rotate said drum relative to said sleeve and shield, and an agitator within said sleeve.

9. In a machine for longitudinally orienting a plurality of elongated objects having differentiated ends, a cylindrical shell having helical grooves on its interior adapted freely to receive the minor axes of said objects; a stationary sleeve conforming to said cylindrical surface and spaced from the roots of said grooves by a distance slightly less than the minor axis dimension of said objects, said sleeve having an opening exposing a portion of said grooves; a supplementary shield conforming to said cylindrical surface and spaced from said groove roots by a distance slightly greater than said minor axis dimension, said supplementary shield overlying a portion of the opening in said sleeve; means to rotate said drum relative to said sleeve and shield, said shell, said sleeve and said shield being inclined to the horizontal, and an agitator within said sleeve.

10. In a machine for longitudinally orienting a plurality of elongated objects having differentiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing less than a semicircle and more than a quadrant of the interior of said cylindrical shell; the lower edge of said opening having its lowermost portion substantially parallel to the axis of said shell, an intermediate helical portion having greater lead than said helical grooves and an upper helical portion having much greater lead than said intermediate portion; a supplementary shield conforming and secured to said sleeve and overlying a portion, at least, of the intermediate portion of said edge and a part of the upper portion of said edge, and terminating in a free end, short of the end of said upper portion; means to rotate said shell about both said sleeve and shield, and an output chute adjacent to the upper portion of the lower edge of said opening.

11. In a machine for longitudinally orienting a plurality of elongated objects having differentiated ends, a rotatable cylindrical shell having helical grooves on its interior adapted freely to receive the minor axes of said objects; a stationary sleeve conforming to said cylindrical surface and having its outer surface spaced from the roots of said grooves by a distance slightly less than the minor axis dimension of said objects; said sleeve having an opening exposing less than a semicircle and more than a quadrant of the interior of said cylindrical shell; the lower edge of said opening having its lowermost portion substantially parallel to the axis of said shell, an intermediate helical portion having greater lead than said helical grooves and an upper helical portion having much greater lead than said intermediate portion; a supplementary shield conforming and secured to said sleeve and overlying a portion, at least, of the intermediate portion of said edge and a part of the upper portion of said edge, and terminating in a free end, short of the end of said upper portion; means to rotate said shell about both sleeve and shield; an output chute adjacent to the upper portion of the lower edge of said opening, and an input chute delivering objects to the interior of said sleeve.

12. A machine for longitudinally orienting a plurality of elongated objects having differentiated ends comprising a rotatable cylindrical shell, a stationary sleeve within said shell and having its outer surface uniformly spaced from said shell, said sleeve having an opening therein through which said objects are directed into contact with said shell, one of the edges of said opening being formed to support said objects in a substantially upright position, means for advancing said objects along said edge and for inclining the axes of said objects as they advance along said edge whereby they are discharged thereover, and means carried by said sleeve for temporarily restraining some of said objects from toppling off said edge, said sleeve being adjustable circumferentially with respect to said shell, whereby the position of said edge and said restraining means may be varied to change the point of discharge of objects in accordance with varying characteristics thereof.

13. A machine for longitudinally orienting an indiscriminate mass of elongated objects having differentiated ends comprising means for bringing objects from said mass into a continuous series with their longitudinal axes parallel and consecutively through a zone in which said axes are approximately vertical, a first member having a surface upon which the ends of the objects in said zone rest, said first-named means consecutively advancing said objects along said surface into positions in which each of said objects tends to topple from said first member, a second member temporarily restraining said objects from toppling off said first member, said first and second members being so related that objects having one type of end resting on the surface of said first member will drop therefrom while being prevented from toppling by said second member and objects having the opposite end resting on said surface will advance beyond said second member to topple from said first member, and means for receiving and discharging said objects with their axes in alignment.

14. A machine for longitudinally orienting an indiscriminate mass of elongated objects having differentiated ends comprising means for bringing objects from said mass into a continuous series with their longitudinal axes parallel and consecutively through a zone in which said axes are approximately vertical, a first member having a surface upon which the ends of the objects in said zone rest, said first-named means consecutively advancing said objects along said surface into positions in which each of said objects tends to topple from said first member, a second member temporarily restraining said objects from toppling off said first member, said first and second members being so spaced from one another that objects having one type of end resting on the surface of said first member will drop therebetween while being prevented from toppling by said second member, said first member extending beyond said second member whereby objects having the opposite end resting on said surface will advance beyond said second member to topple from said first member, and means for receiving and discharging said objects with their axes in alignment.

ERNEST W. EKSTRAND.